United States Patent
Sommers et al.

(10) Patent No.: US 12,505,309 B2
(45) Date of Patent: Dec. 23, 2025

(54) METHODS, SYSTEMS, AND COMPUTER READABLE MEDIA FOR NETWORK TEST CONFIGURATION AND EXECUTION USING BROKERED COMMUNICATIONS WITH A LARGE LANGUAGE MODEL (LLM)

(71) Applicant: Keysight Technologies, Inc., Santa Rosa, CA (US)

(72) Inventors: Christian Paul Sommers, Bangor, CA (US); Peter J. Marsico, Chapel Hill, NC (US)

(73) Assignee: KEYSIGHT TECHNOLOGIES, INC., Santa Rosa, CA (US)

( * ) Notice: Subject to any disclaimer, the term of this patent is extended or adjusted under 35 U.S.C. 154(b) by 153 days.

(21) Appl. No.: 18/243,070

(22) Filed: Sep. 6, 2023

(65) Prior Publication Data
US 2024/0378395 A1 Nov. 14, 2024

Related U.S. Application Data

(60) Provisional application No. 63/466,037, filed on May 12, 2023.

(51) Int. Cl.
*G06F 40/40* (2020.01)
*G06F 16/3329* (2025.01)
(Continued)

(52) U.S. Cl.
CPC .............. *G06F 40/40* (2020.01); *H04L 41/08* (2013.01); *H04L 43/50* (2013.01)

(58) Field of Classification Search
CPC ..... G06F 40/40; G06F 16/3329; H04L 41/08; H04L 43/50
(Continued)

(56) References Cited

U.S. PATENT DOCUMENTS 11,093,666 B2   8/2021   Minwalla et al.
11,405,266 B2   8/2022   Nadella et al.
(Continued)

FOREIGN PATENT DOCUMENTS

EP   4113941 A1   1/2023
WO   2019186367 A1   10/2019
(Continued)

OTHER PUBLICATIONS

Combined Search and Examination Report for GB 2406524.5 (Oct. 5, 2024).
(Continued)

*Primary Examiner* — George C Monikang (57) ABSTRACT

One example method for network test configuration and execution using brokered communications with a large language model (LLM) comprises receiving, at an LLM communication broker and from a user, input regarding a network test objective for a network test; generating, by the LLM communication broker, based on the input regarding the network test objective, and using an application programming interface (API) of the LLM, input for invoking the LLM to produce configuration instructions for the network test; providing, by the LLM communication broker and to the LLM, the input for invoking the LLM to produce the configuration instructions; receiving, by a network test system, the configuration instructions for the network test; using, by the network test system, the configuration instructions to configure a network test system to conduct the network test; and conducting, by the network test system, the network test.

18 Claims, 8 Drawing Sheets

(51) Int. Cl.
    *H04L 41/08* (2022.01)
    *H04L 43/50* (2022.01)
(58) Field of Classification Search
    USPC .................................. 704/9, 200, 201, 202
    See application file for complete search history.

(56) References Cited

U.S. PATENT DOCUMENTS

| | | |
|---|---|---|
| 2021/0279577 A1 | 9/2021 | West et al. |
| 2022/0365866 A1 | 11/2022 | Mishra et al. |
| 2024/0330157 A1* | 10/2024 | Somawagol ........ G06F 11/3676 |
| 2025/0209375 A1 | 6/2025 | Sommers et al. |

FOREIGN PATENT DOCUMENTS

| | | |
|---|---|---|
| WO | 2022028721 A1 | 2/2022 |
| WO | 2022208133 A1 | 10/2022 |
| WO | 2022237253 A1 | 11/2022 |
| WO | 2022242923 A1 | 11/2022 |

OTHER PUBLICATIONS

Commonly-Assigned, co-pending U.S. Appl. No. 18/930,339 for "Methods, Systems, and Computer Readable Media for Automated Parsing and Interpreting of Communication Protocol Specification and Generating Corresponding Conformance Testing Computer Code Using Generative Artificial Intelligence (AI)" (Unpublished, filed Oct. 29, 2024).

Sharma, et al., "PROSPER: Extracting Protocol Specifications Using Large Language Models", The 22nd ACM Workshop on Hot Topics in Networks (HotNets '23), pp. 1-7 (Nov. 28-29, 2023).

Yen, et al., "Sem-Automated Protocol Disambiguation and Code Generation", SIGCOMM '21, pp. 1-15 (Aug. 23-28, 2021).

Commonly-Assigned, co-pending U.S. Appl. No. 18/422,953 for "Methods, Systems, and Computer Readable Media for Generating Synthetic Artificial Intelligence (AI)—Implemented Computer Network Behavioral Model Training Data" (Unpublished, filed Jan. 25, 2024).

Intention to Grant for GB 2406524.5 (May 13, 2025).

Notice of Allowance for GB 2406524.5 (Aug. 15, 2025).

* cited by examiner

```
from ixnetwork_restpy import SessionAssistant

# Connect to the IxNetwork API server
# Update the following variables with your server details
api_server_ip = "your_api_server_ip"
ixnetwork_version = "your_ixnetwork_version"

# Establish a connection to the API server
session = SessionAssistant(IpAddress=api_server_ip, ApiKey=None,
LogLevel='info', ClearConfig=True)
ixnetwork = session.Ixnetwork

# Add a virtual port to the topology
vport = ixnetwork.Vport.add(Name='vport1', Location='10.10.10.1')

# Add an Ethernet stack to the virtual port
ethernet = vport.Ethernet.add(Name='ethernet1')

# Add an IPv4 stack to the Ethernet stack
ipv4 = ethernet.Ipv4.add(Name='ipv4_1', Address='10.0.0.1', Prefix=24)

# Add OSPF router to the IPv4 stack
ospf = ipv4.Ospfv2.add(Name='ospf_1', RouterId='1.1.1.1')
```

```
# Configure OSPF parameters
ospf.NetworkType.SingleAccess.value = True

# Add a network group for OSPF
network_group = ipv4.NetworkGroup.add(Name='networkGroup1')
network_group.Multiplier = 10
network_group.IpStart = '10.0.0.1'
network_group.Step = '0.0.0.1'

# Start OSPF protocol
ospf.Start()

# Add ICMP traffic item
traffic_item = ixnetwork.Traffic.TrafficItem.add(Name='icmp_traffic', BiDirectional=False)
endpoint_set = traffic_item.EndpointSet.add(Sources=ipv4, Destinations='::ffff:10.0.0.2')
stack = endpoint_set.Stack.find(DisplayName='ICMPv4')
stack.ConfiguredType = 'ipv4'
```

FIG. 4B

```
# Configure traffic item parameters
traffic_item.Tracking.find()[0].TrackBy = ['flowGroup0']
traffic_item.FrameRate.Rate = 1000
traffic_item.FrameRate.Type = 'framesPerSecond'
traffic_item.FrameRate.PortDistribution = 'splitRateEvenly'

# Apply traffic settings
traffic_item.Generate()

# Start traffic
ixnetwork.Traffic.Apply()
ixnetwork.Traffic.Start()

# Wait for traffic to run
ixnetwork.Traffic.WaitUntilTrafficEnd()

# Stop traffic
ixnetwork.Traffic.Stop()

# Cleanup and close the session
session.Ixnetwork.StopAllProtocols(force=True)
session.Session.remove()

print("Testing completed.")
```

FIG. 4C

| LLM ID | PRE-LLM DATA | POST-LLM DATA | USE CASE DESCRIPTION |
|---|---|---|---|
| LLM 1 | SUT 1 TOPOLOGY (e.g., IP Range, number of nodes, links, protocol(s)) | OUTPUT VERIFICATION/ ADJUSTMENT (OVA) | CHATGPT 3.5, 5G NETWORK |
| LLM 2 | SUT 1 TOPOLOGY | OVA, CONVERSION | CHATGPT 4, 5G NETWORK |
| LLM 3 | SUT 1 TOPOLOGY | OVA, CONVERSION | BARD, 5G NETWORK |
| LLM 1 | SUT 2 TOPOLOGY | OVA | CHATGPT 3.5, 4G NETWORK |
| LLM 2 | SUT 2 TOPOLOGY | OVA, CONVERSION | CHATGPT 4, 4G NETWORK |
| LLM 3 | SUT 2 TOPOLOGY | OVA, CONVERSION | BARD, 4G NETWORK |
| LLM 1 | SUT 3 TOPOLOGY | OVA | CHATGPT 3.5, ETHERNET NETWORK |

METHODS, SYSTEMS, AND COMPUTER READABLE MEDIA FOR NETWORK TEST CONFIGURATION AND EXECUTION USING BROKERED COMMUNICATIONS WITH A LARGE LANGUAGE MODEL (LLM)

PRIORITY CLAIM

This application claims the priority benefit of U.S. Provisional Patent Application Ser. No. 63/466,037, filed May 12, 2023, the disclosure of which is incorporated herein by reference in its entirety.

TECHNICAL FIELD

The subject matter described herein relates to testing network devices. More particularly, the subject matter described herein relates to network test configuration and execution using brokered communications with a large language model (LLM).

BACKGROUND

Network operators typically test network nodes for reliability and other characteristics before deploying the network nodes to production environments (e.g., non-test environments). Generally, it is important to test networks nodes with various amounts of traffic and different types of traffic. Testing of network devices typically involves a network traffic generator generating and transmitting test packets to a DUT, receiving packets from the DUT, and measuring one or more operational aspects, such as performance and/or resilience, of the DUT based on statistics generated from the transmitted and received packets. For example, a test platform, such as an IxNetwork™ platform manufactured by Keysight, may be usable for network topology testing and traffic analysis and may generate test traffic for testing various network nodes using one or more protocols.

When configuring a network test system, a test operator may require domain knowledge. For example, a test operator may need to know not only the capabilities of the test system but also the network topology being tested and the test scenario desired. Further, a test operator may need to know the appropriate way to input configuration information to achieve the test scenario, e.g., a programming language or a configuration graphical user interface (GUI) provided by the test system. Advancements in artificial intelligence (AI), e.g., a generative AI system or a system that uses a large language model (LLM), may help a test operator generate information usable for configuring or programming a network test system. However, issues can arise from using this technology, e.g., AI generated output may be incomplete, inaccurate, or incompatible with the test system or various aspects thereof.

Accordingly, in light of these and other difficulties, there exists a need for network test configuration and execution using brokered communications with a large language model (LLM).

SUMMARY

Methods, systems, and computer readable media for network test configuration and execution using brokered communications with a large language model (LLM) are disclosed. One example method for network test configuration and execution using brokered communications with an LLM comprises receiving, at an LLM communication broker and from a user, input regarding a network test objective for a network test; generating, by the LLM communication broker, based on the input regarding the network test objective, and using an application programming interface (API) of the LLM, input for invoking the LLM to produce configuration instructions for the network test; providing, by the LLM communication broker and to the LLM, the input for invoking the LLM to produce the configuration instructions; receiving, by a network test system, the configuration instructions for the network test; using, by the network test system, the configuration instructions to configure a network test system to conduct the network test; and conducting, by the network test system, the network test.

According to one example system for network test configuration and execution using brokered communications with an LLM, the system comprises a memory, at least one processor, and a network test system implemented using the memory and the at least one processor. The network test system is configured for: receiving, at an LLM communication broker and from a user, input regarding a network test objective for a network test; generating, by the LLM communication broker, based on the input regarding the network test objective, and using an API of the LLM, input for invoking the LLM to produce configuration instructions for the network test; providing, by the LLM communication broker and to the LLM, the input for invoking the LLM to produce the configuration instructions; receiving, by a network test system, the configuration instructions for the network test; using, by the network test system, the configuration instructions to configure a network test system to conduct the network test; and conducting, by the network test system, the network test.

The subject matter described herein may be implemented in software in combination with hardware and/or firmware. For example, the subject matter described herein may be implemented in software executed by a processor (e.g., a hardware-based processor). In one example implementation, the subject matter described herein may be implemented using a non-transitory computer readable medium having stored thereon computer executable instructions that when executed by the processor of a computer control the computer to perform steps. Example computer readable media suitable for implementing the subject matter described herein include non-transitory devices, such as disk memory devices, chip memory devices, programmable logic devices, such as field programmable gate arrays, and application specific integrated circuits. In addition, a computer readable medium that implements the subject matter described herein may be located on a single device or computing platform or may be distributed across multiple devices or computing platforms.

BRIEF DESCRIPTION OF THE DRAWINGS

The subject matter described herein will now be explained with reference to the accompanying drawings of which.

DETAILED DESCRIPTION

The subject matter described herein relates to methods, systems, and computer readable media for network test configuration and execution using brokered communications with a large language model (LLM). Network nodes, like routers and switchers, require testing for various reasons including stress testing, quality assurance, and/or user experience. A network test system may be configured or programmed to perform testing under various test scenarios. When configuring a network test system, a test operator may require or benefit from domain knowledge. For example, a test operator may need to know not only the capabilities of the test system but also the network topology being tested and the desired test scenario or objectives. Further, a test operator may need to know the appropriate way to input configuration information to achieve the test scenario, e.g., a programming language or a configuration graphical user interface (GUI) provided by the test system. Advancements in artificial intelligence (AI), e.g., a generative AI system or a system that uses an LLM, may help a test operator generate information usable for configuring or programming a network test system. However, issues can arise from using this technology, e.g., AI generated output may be incomplete, inaccurate, or incompatible with the test system or various aspects thereof.

In accordance with some aspects of the subject matter described herein, techniques, methods, equipment, systems, and/or mechanisms are disclosed for network test configuration and execution using brokered communications with an LLM. In some embodiments, a network test system in accordance with aspects described herein may be configured for communicating with an LLM system, e.g., a generative AI system, an artificial intelligence chatbot, a chat generative pretrained transformer (GPT) chatbot, OpenAI ChatGPT, Google Bard, GitHub Copilot, etc. In such embodiments, the network test system or related functionality therein (e.g., an LLM communication broker) may be configured to communicate with the LLM system using one or more application programming interface(s) (e.g., a representation state transfer (REST) API, a proprietary API, etc.).

In accordance with some aspects of the subject matter described herein, a network test system or an LLM communication broker in accordance with aspects described herein may interact with a user to obtain user intent or related input regarding a test scenario, optionally modify or supplement the input, and then send the input (or modified/supplemented input) to an LLM system. In such embodiments, the network test system or LLM communication broker may receive output from the LLM system, optionally modify (e.g., verify and correct) or supplement the output, and then send or provide the output to a test controller or other entity of the test system for use in network configuration and/or test execution.

In accordance with some aspects of the subject matter described herein, a network test system or an LLM communication broker in accordance with aspects described herein may utilize AI or machine learning (ML) to improve LLM communication broker or related functionality. For example, an update module may be configured for analyzing user input, corresponding AI generated output, and final or actual configuration instructions used by a network test system to determine that an LLM communication broker or related logic should be updated, changed, or modified to improve prompts (e.g., input sent to an LLM) and/or to improve LLM generated output for use in test configuration and/or execution. In another example, an update module may use user feedback in determining whether the LLM communication broker or related logic should be updated, changed, or modified.

Reference will now be made in detail to various embodiments of the subject matter described herein, examples of which are illustrated in the accompanying drawings. Wherever possible, the same reference numbers will be used throughout the drawings to refer to the same or like parts.

Figure 1:
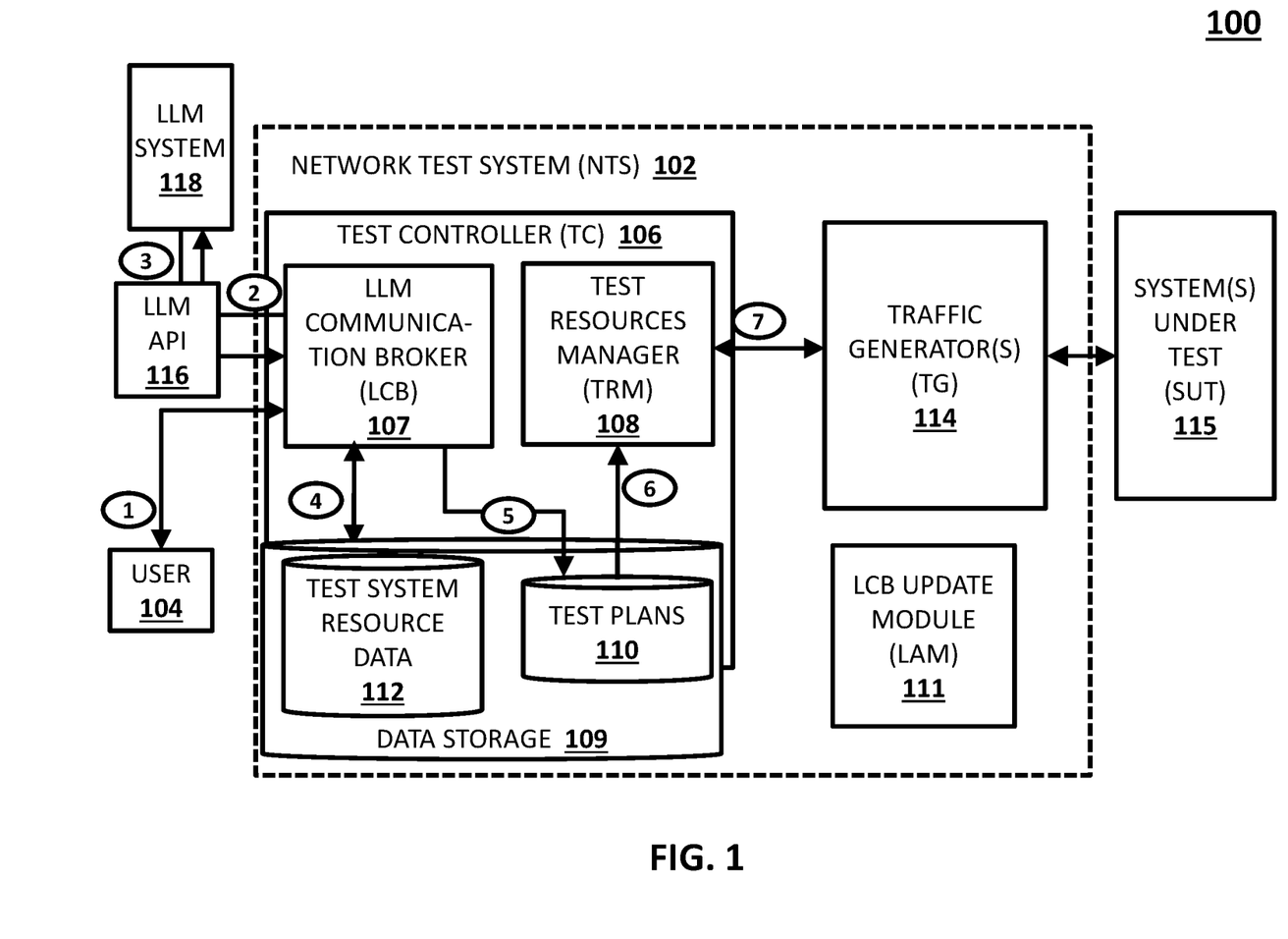
FIG. 1 is a diagram illustrating an example test environment including a network test system that interacts with a large language model (LLM) system.

FIG. 1 is a diagram illustrating an example test environment 100 including a network test system (NTS) 102 that interacts with an LLM system 118. NTS 102 may represent any suitable entity or entities (e.g., one or more testing platforms, nodes, or devices) associated with sending or receiving traffic (e.g., one or more data units). For example, NTS 102 may generate and send test traffic to one or more system(s) under test (SUT) 115, e.g., a network, network nodes, one or more device(s), etc. In this example, NTS 102 may receive the test traffic or related traffic from SUT 115 and analyze one or more performance aspects associated with SUT 115.

In some embodiments, NTS 102 may be a stand-alone tool, a testing device, a testing platform, or software executing on at least one processor. In some embodiments, NTS 102 may be a single node or may be distributed across multiple computing platforms or nodes.

NTS 102 may include a test controller (TC) 106, an LLM communication broker (LCB) 107, a test resources manager (TRM) 108, an LCB update module (LAM) 111, data storage 109, and/or one or more traffic generator(s) (TG) 114. In some embodiments, NTS 102 may provide user interface(s) for communicating with user 104 (e.g., a test operator), LLM system 118, and/or another entity.

User 104 may include any entity (e.g., an automated system or a device or system controlled or controllable by a human user) for selecting and/or configuring various aspects associated with configuring and/or executing one or more tests. In some embodiments, user interface(s) (e.g., an API or a GUI) of NTS 102 may be provided for receiving user input and/or providing configuration information, test traffic patterns, service emulation settings, etc. In some embodiments, user interface(s) of NTS 102 may support automation (e.g., via one or more scripting languages), a representation state transfer (REST) or other API, a command line interface (CLI), and/or a web-based GUI.

TC 106 may be any suitable entity or entities (e.g., software executing on a processor, an application-specific integrated circuit (ASIC), a field-programmable gate array (FPGA), or a combination of software, an ASIC, or an FPGA) for performing one or more aspects associated with instructing or controlling test execution and/or for facilitating configuration of various aspects of NTS 102. In some embodiments, TC 106 may be implemented using processor(s) (e.g., a physical processor, a general purpose microprocessor, a single-core processor, a multi-core processor, an FPGA, and/or an ASIC for executing software and/or logic) and/or memory for storing data, logic, software, or other information.

In some embodiments, TC 106 may include one or more communications interfaces, e.g., one or more network interface cards (NICs), for interacting with users, modules, and/or nodes. For example, TC 106 may use one or more communications interfaces for receiving or sending various messages. In this example, some of the communications interfaces support automation, e.g., via one or more programming languages (e.g., python, PHP, etc.), a REST API, a CLI, and/or a web-based GUI.

LCB 107 may be any suitable entity or entities (e.g., software executing on a processor, an ASIC, an FPGA, or a combination of software, an ASIC, or an FPGA) for performing one or more aspects associated with brokering communications between user 104 and LLM system 118. For example, LCB 107 may utilize user input and stored data about NTS 102 or various test system resources to generate an API request to LLM system 118, e.g., using an LLM API 116. In this example, LCB 107 may provide additional data to LLM system 118 for obtaining LLM output usable for test configuration and/or test execution. Continuing with this example, after receiving LLM output via one or more API response(s), LCB 107 may modify or augment the LLM output and may use this information to generate a test plan comprising test configuration instructions, test execution instructions, or related data.

TRM 108 may be any suitable entity or entities (e.g., software executing on a processor, an ASIC, an FPGA, or a combination of software, an ASIC, or an FPGA) for performing one or more aspects associated with sending commands or instructions to test system resources for setting up and/or executing a test scenario or test plan. In some embodiments, TRM 108 may include a test command and control module for configuring test system resources (e.g., TG 114) for a test plan and for executing the test plan.

Data storage 109 may be any suitable entity or entities (e.g., a storage device, a non-transitory computer readable medium, or a storage system) for maintaining or storing information related to testing, LLMs, LLM user prompt generation, LLM output processing, and/or related metrics. In some embodiments, data storage 109 may include test system resource data 112, e.g., hardware specifications, software specifications, API information, default settings, limitations, features, etc. In some embodiments, data storage 109 may include test plan data 110, e.g., test plans, test plan templates, test resource topology information, test traffic models, test cases, test session data, SUT information, topology information for SUT 115, and/or other information usable for SUT testing or for generating performance metrics (e.g., statistics) associated with one or more aspects of SUT 115. In some embodiments, data storage 109 may be located at NTS 102, TC 106, another node, or distributed across multiple platforms or devices.

LAM 111 may be any suitable entity or entities (e.g., software executing on a processor, an ASIC, an FPGA, or a combination of software, an ASIC, or an FPGA) for improving LCB 107 or related functionality, e.g., improving brokered communications or interactions between user 104 and LLM system 118. In some embodiments, LAM 111 may include an AI or ML algorithm or module that takes historical data and/or user feedback to modify LCB 107 or related functions. For example, if a test case or plan generated using LLM output is not what user 104 expected or desired, user 104 can provide feedback indicating deficiencies or issues. In this example, the feedback may be used by LAM 111 to improve LCB 107 or related functionality, e.g., by adding or changing logic for correcting or mitigating identified deficiencies or issues in subsequently generated test plans using LLM output.

TG 114 may be any suitable entity or entities (e.g., software executing on a processor, an ASIC, an FPGA, or a combination of software, an ASIC, or an FPGA) for performing one or more aspects associated with generating or synthesizing test sessions, test cases, or related test packets. In some embodiments, TG 114 or another test system resource (e.g., a port module) may include various hardware and/or software that is configurable for processing, generating, sending, and/or receiving test traffic. For example, TG 114 or other resources may be configured or provisioned by TRM 108 or configuration instructions received therefrom. For example, TG 114 may receive configuration instructions from TRM 108. In this example, TG 114 may use the configuration instructions and/or predefined test case templates or related data to generate one or more traffic flows.

In some embodiments, TG 114 or a test system resource (e.g., a monitoring agent or node) may obtain traffic information associated with SUT 115 from monitoring taps or other sources, e.g., via PCAP files and associated flow metadata (e.g., Netflow records). In such embodiments, TG 114 or the test system resource may provide the traffic information to a test analyzer or another entity, e.g., LAM 111 or TC 106.

SUT 115 may be any suitable entity or entities (e.g., devices, systems, or platforms) for communicating with NTS 102 and/or receiving, processing, forwarding, and/or sending test traffic or other data. For example, SUT 115 may include a network router, a network switch, a network device, a firewall, a gateway, an intrusion detection system, traffic inspection system, a load balancer, a proxy server, an authentication server, an application server, or a network controller. In another example, SUT 115 may include one or more systems and/or computing platforms, e.g., a data center or a group of servers and/or routers. In yet another example, SUT 115 may include one or more networks or related components, e.g., an access network, a core network, or the Internet.

LLM API 116 may be any suitable entity or entities (e.g., software, logic, a data protocol, or a device) for facilitating communications between NTS 102 (e.g., LCB 107) and LLM system 118. In some embodiments, LLM API 116 may include one or more REST APIs, web APIs, proprietary APIs, non-proprietary APIs, etc. In some embodiments, IP addresses or endpoint identifiers (IDs) may be usable for indicating a particular LLM or a related system. For example, LCB 107 may generate requests or messages (e.g., a REST GET message comprising a user prompt or other LLM input) via LLM API 116 destined for LLM system 118. In this example, LCB 107 may receive responses or messages (e.g., a REST POST response message comprising LLM output) via LLM API 116 from LLM system 118.

LLM system 118 may be any suitable entity or entities (e.g., devices, systems, or platforms) for providing a generative AI system or a system that uses an LLM, e.g., a language engine, an artificial intelligence chatbot, a chat GPT chatbot, etc. For example, LLM system 118 may include a web server or group of web servers that utilizes LLM API 116 (e.g., a REST API) to obtain user prompts regarding configuring NTS 102 for a test scenario and outputs, e.g., using an LLM or other AI model, related test configuration instructions or other data for implementing that test scenario. In another example, LLM system 118 may include a system or group of systems that allows one or more LLMs to receive input and to respond accordingly. In this example, a particular LLM of LLM system 118 may be utilized based on the input provided and/or API settings used (e.g., an LLM ID parameter value).

In some embodiments, NTS 102, LCB 107, or another entity may receive user input (e.g., natural language test configuration commands) and generate one or more associated requests that are communicated to LLM system 118 via LLM API 116. In such embodiments, NTS 102, LCB 107, or another entity may receive associated LLM response messages from LLM system 118 via LLM API 116 and use the LLM response messages and available test system resources in generating a test case or test plan comprising test configuration instructions. In such embodiments, NTS 102, TRM 108, or another entity may provide the configuration instructions to relevant test system resources and, optionally for some test scenarios, may provide physical configuration instructions to user 104, e.g., cabling instructions. In some embodiments, after a test environment is setup or configured, NTS 102, TRM 108, or another entity may execute the test plan and report test results to TC 106 and/or user 104.

In some embodiments, NTS 102, LCB 107, or another entity that user input (e.g., network test objectives, configuration objectives, and/or a test scenario) is inconsistent with or conflicts with test system resources that are available and, in response, may adjust or modify the user input accordingly (and/or notify user 104 of the issue or error).

In some embodiments, NTS 102, LCB 107, or another entity may detect that LLM output (e.g., a response including configuration instructions) provided by LLM system 118 is out-of-date or inappropriate for the test system resources that are available and, in response, may adjust or modify the configuration instructions accordingly (and/or notify user 104 of the issue or error).

In some embodiments, NTS 102, LCB 107, or another entity may examine or analyze LLM response(s) to an initial LLM user prompt or request comprising original user input and may automatically respond, when possible, to LLM system 118 when additional information is requested or needed. In some embodiments, e.g., when information requested or needed by LLM system 118 is not known, NTS 102, LCB 107, or another entity may ask user 104 (e.g., via a GUI) for the requested information.

In some embodiments (e.g., prior to sending an initial request to LLM system 118), NTS 102, LCB 107, or another entity may process user input and augment the user input by accessing and selecting a list of available test system resources (e.g., load modules, traffic generators, etc.) and adding test system resource information about those resources to the initial request. For example, user 104 may provide user input to LCB 107 indicating that an ixNetwork test plan should be created for sending web traffic flows to 5 ports of a network switch and LCB 107 may create or modify an LLM user prompt (for sending to LLM system 118) indicating an IP address and port numbers of the network switch along with capabilities information about TG 114, e.g., model number, supported protocols, throughput, etc. In another example, based on a user's specified intent or objectives, NTS 102, LCB 107, or another entity may automatically assign or configure at least a portion of test system resources for fulfilling the user's specified intent or objectives, and LCB 107 may report the configuration of these test system resources to LLM system 118 via LLM API 116, e.g., in an effort to facilitate more useful LLM output.

In some embodiments, NTS 102, LCB 107, or another entity may generate additional or follow-on LLM user prompts or requests that are communicated to LLM system 118. For example, LCB 107 may examine or analyze LLM response(s) to an initial LLM user prompt or request and automatically ask the user for additional input(s) or user-specified instructions. In this example, the additional inputs or instructions may be processed by LCB 107 and provided to LLM system 118 via LLM API 116, e.g., using one or more LLM user prompts or requests.

In some embodiments, NTS 102, LCB 107, or another entity may analyze user input (e.g., prior to sending a request to LLM system 118) or LLM output (e.g., while interacting with LLM system 118), determine that additional information is available (e.g., stored in data storage 109) and can improve or further complete a test scenario or use case indicated by user 104, and then provide the additional information to LLM system 118 (along with any other natural language intents or declarations specified by user 104). For example, based on a user's specified intent, LCB 107 may determine that various test resource information maintained by or accessible to NTS 102 may be relevant to the user's request (e.g., helpful to LLM system 118 generating useful LLM output for SUT testing) and, in response, may provide the test resource information to LLM system 118 via LLM API 116. Exemplary test resource information may include, protocol specification information, DUT capability information, test bed switching fabric configuration, capabilities, etc. In such embodiments, LLM system 118 may attempt to complete a test plan (e.g., a test case definition and/or configuration instructions) on behalf of user 104 using the information provided by LCB 107.

Referring to FIG. 1, user 104 may provide user input to NTS 102 for describing a test scenario, a test plan, or a test objective and/or intent to be implemented and NTS 102 (e.g., via LCB 107) may receive LLM output usable for test configuration(s) and/or test execution(s).

In step 1, user 104 may provide user input (e.g., natural language instructions) to NTS 102 via LCB 107 or another entity. For example, user-generated instructions may include declarative-type instructions associated with testing SUT 115. In some examples, user 104 may be able to completely articulate a description of a test environment using natural language without the need for graphical SUT/DUT topology maps or additional inputs. In some examples, user 104 may be unable to completely articulate a description of a test environment using natural language and may provide graphical SUT/DUT topology maps or additional inputs via a GUI or other user interface(s).

In step 2, NTS 102, LCB 107, or another entity may receive and process the user input and may use this information in generating one or more API messages or requests (e.g., LLM user prompts for obtaining configuration instructions) directed to LLM system 118 via LLM API 116. In some embodiments, NTS 102, LCB 107, or another entity may modify user input, e.g., by adding details, adding available test resource-specific information, adjusting specific language or word choice, removing details, following up with user 104 for additional information, etc.

In step 3, NTS 102, LCB 107, or another entity may receive and process LLM output (e.g., response messages from LLM system 118 via LLM API 116).

In step 4, NTS 102, LCB 107, or another entity may determine available or appropriate test system resources (e.g., TG 114, load modules, test agents, monitoring agents, etc.) using test system resource data 112 for implementing a relevant test scenario or use case. For example, NTS 102, LCB 107, or another entity may access a list of available test system resources (e.g., load modules, TG 114, etc.) and obtain corresponding test system resource information.

In step 5, NTS 102, LCB 107, or another entity may utilize LLM output and information about available test system resources in generating a test plan. For example, a test plan may indicate test system resources and associated resource configurations and connectivity, and may include or indicate test configuration instructions for configuring the test system resources.

In step 6, NTS 102, TRM 108, or another entity may utilize and execute the test plan, e.g., by sending configuration instructions to various test system resources (e.g., TG 114) and preparing the resources for test execution.

In step 7, NTS 102, TRM 108, or another entity may initiate or perform test execution, e.g., by configuring and controlling associated test system resources and collecting or reporting associated test results.

It will be appreciated that FIG. 1 is for illustrative purposes and that various nodes and/or modules, locations, and/or functionality described above in relation to FIG. 1 may be changed, altered, added, or removed.

Figure 2:
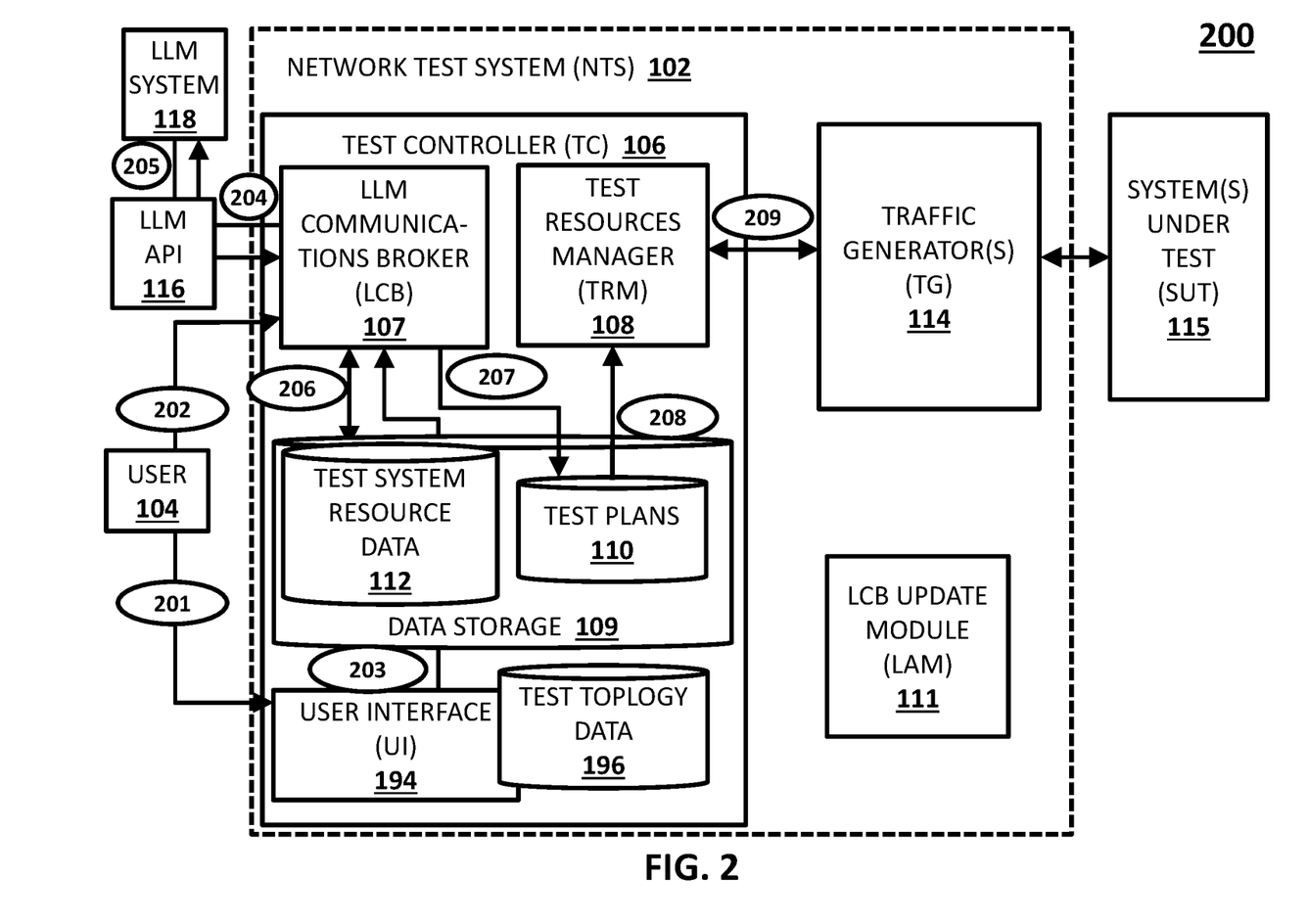
FIG. 2 is a diagram illustrating an example LLM communication broker (LCB) that interacts with an LLM system in a complex test scenario.

FIG. 2 is a diagram illustrating LCB 107 that interacts with LLM system 118 in another test environment 200. In some embodiments, test environment 200 may involve a complex, interconnected SUT environment that requires multiple links, test system resources, or test or network test objectives (e.g., configuration objectives, SUT performance objectives, test traffic objectives, etc.) that are hard to articulate with natural language instructions or higher-level user input. In such embodiments, user 104 may be unable to efficiently and/or completely articulate a description of the test environment using natural language without using a user interface (UI) 194 associated with NTS 102. For example, UI 194 may include or provide a GUI for inputting a SUT topology or other UI-aided content. In this example, UI 194 or a related entity may use stored data, like test topology data 196, to supplement, suggest, or inform user 104 about SUT topology decision or possibilities while using or interacting with UI 194.

In some embodiments, NTS 102 or TC 106 may provide UI 194 (e.g., a test system GUI) for allowing user 104 to define SUT topologies and optionally provide some SUT or device configuration information. In such embodiments, LCB 107 may be configured for analyzing, processing, or interpreting this additional test topology definition information for generating one or more LLM API instructions or commands for LLM system 118. In some embodiments, user 104 may use natural language to specify or define other aspects of the test environment or desired test objective(s), etc. When user 104 provides natural language instructions, NTS 102, e.g., via LCB 107, may be configured for augmenting user instructions, e.g., generating and sending user prompts or commands to LLM system 118 via LLM API 116, where the user prompts or commands incorporate or include at least some UI-provisioned DUT/SUT information (e.g., SUT topology information, etc.) thereby augmenting the user's natural language instructions to LLM system 118.

In some embodiments, LCB 107 or another entity may provide instruction augmentation functionality (e.g., similar to such functionality described above) during multi-transaction exchanges or interactions via LLM API 116. For example, user 104 may speak or type input (e.g., natural language instructions, high-level intent-based test directives, etc.) to NTS 102 or related entities (e.g., UI 194, LCB 107, etc.), which in turn passes the input to LLM system via LLM API 116 with little or no modification. In another example, LCB 107 may be configured for providing additional input (e.g., GUI-provisioned DUT/SUT information, etc.) in requests or commands to LLM system 118 via LLM API 116, thereby augmenting the original input from user 104.

In some embodiments, unless otherwise described, elements in FIG. 2 may include similar or same functionality as those same-numbered elements in FIG. 1.

Referring to FIG. 2, in step 201, user 104 may provide UI-assisted input (e.g., GUI-provisioned SUT topology map) via UI 194.

In step 202, user 104 may provide user input (e.g., natural language instructions) to NTS 102 via LCB 107 or another entity. For example, user-generated instructions may include declarative-type instructions associated with testing SUT 115.

In step 203, UI-assisted input may be augmented or modified using predetermined test topology data 196 and provided to LCB 107.

In step 204, NTS 102, LCB 107, or another entity may receive and process the user input and the UI-assisted input and may use this information in generating one or more API messages or requests (e.g., LLM user prompts) directed to LLM system 118 via LLM API 116. In some embodiments, NTS 102, LCB 107, or another entity may modify user input and/or UI-assisted input, e.g., by adding details, adjusting specific language or word choice, removing details, following up with user 104 for additional information, etc.

In step 205, NTS 102, LCB 107, or another entity may receive and process LLM output (e.g., response messages from LLM system 118 via LLM API 116).

In step 206, NTS 102, LCB 107, or another entity may determine available or appropriate test system resources (e.g., TG 114, load modules, test agents, monitoring agents, etc.) using test system resource data 112 for implementing a relevant test scenario or use case. For example, NTS 102, LCB 107, or another entity may access a list of available test system resources (e.g., load modules, TG 114, etc.) and obtain corresponding test system resource information.

In step 207, NTS 102, LCB 107, or another entity may utilize LLM output and information about available test system resources in generating a test plan. For example, a test plan may indicate test system resources and associated resource configurations and may include or indicate test configuration instructions for configuring the test system resources.

In step 208, NTS 102, TRM 108, or another entity may utilize and execute the test plan, e.g., by sending configuration instructions to various test system resources (e.g., TG 114) and preparing the resources for test execution.

In step 209, NTS 102, TRM 108, or another entity may initiate or perform test execution, e.g., by configuring and controlling associated test system resources and collecting or reporting associated test results.

It will be appreciated that FIG. 2 is for illustrative purposes and that various nodes and/or modules, locations, actions, and/or functionality described above in relation to FIG. 2 may be changed, altered, added, or removed.

Figure 3:
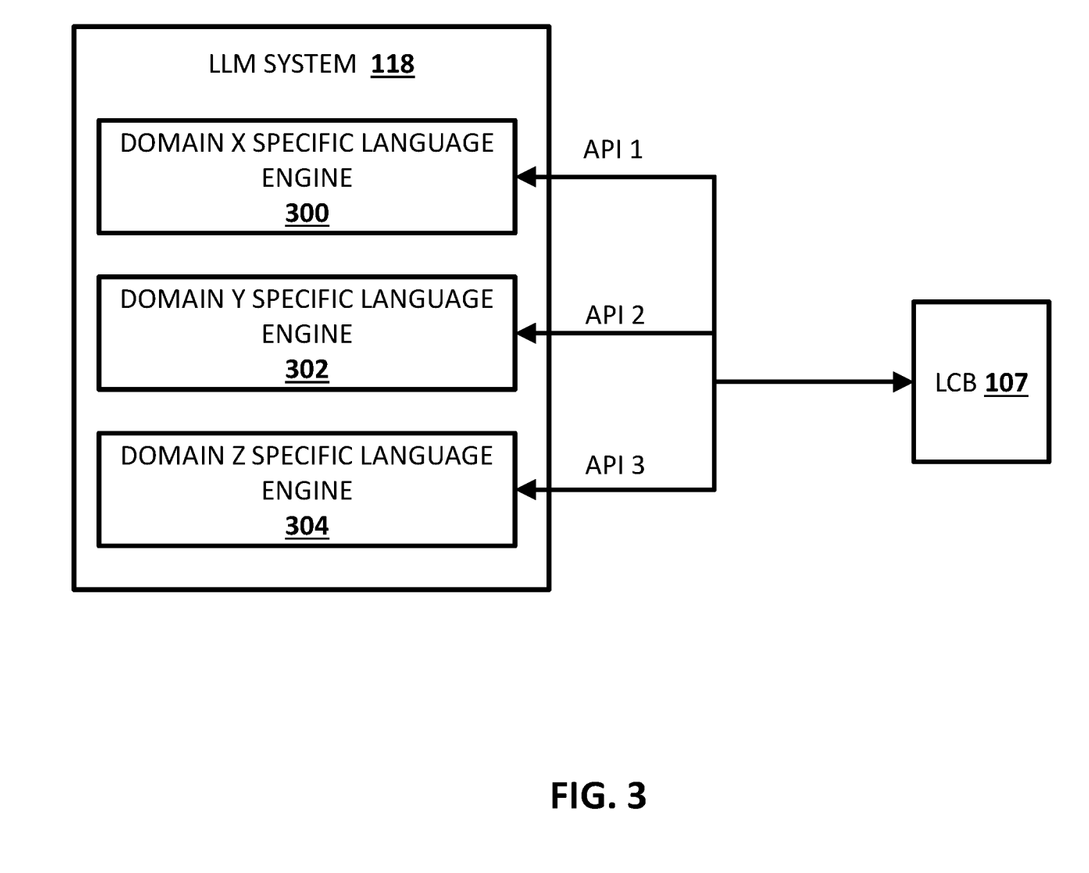
FIG. 3 is a diagram illustrating an example LLM system comprising multiple domain specific language engines.

FIG. 3 is a diagram illustrating LLM system 118 comprising multiple domain specific language engines 300-304. In some embodiments, LLM system 118 may be any suitable entity or entities (e.g., a computing platform or a service) for providing one or more LLMs or related language engines (e.g., software or logic that utilizes an AI or ML trained LLM, an artificial intelligence chatbot, a chat GPT chatbot, etc.). For example, LLM system 118 may represent an AI service provider or related platform that allows entities to interact with one or more language engines (e.g., an LLM) that generates output in response to a user prompt or other input. In this example, LLM system 118 may provide a unique API or other mechanism for allowing user 104, LCB 107, or another entity to interact with one of domain specific language engines 300-304.

In some embodiments, each of domain specific language engines 300-304 may be trained to provide specialized output for a given domain, e.g., a use case, a programming language, a test system, a DUT/SUT type (e.g., 5G core network element(s), a zero-trust authentication element(s), a network monitoring element(s), data center switching fabric element(s), etc.) and/or a test scenario. For example, domain X specific language engine 300 may be trained using test configuration instructions for testing fifth generation (5G) networks or related nodes, domain Y specific language engine 302 may be trained using test configuration instructions for testing fourth generation (4G) networks or related nodes, and domain Z specific language engine 304 may be trained using test configuration instructions for testing 4G, 5G, next generation and/or hybrid networks or related nodes. In another example, domain X specific language engine 300 may be trained using test configuration instructions in Python for testing communications networks or related nodes, domain Y specific language engine 302 may be trained using test configuration instructions in an XML or REST format for testing communications networks or related nodes, and domain Z specific language engine 304 may be trained using test configuration instructions in a particular proprietary format or protocol for testing communications networks or related nodes.

In some embodiments, each of domain specific language engines 300-304 may be provided by a distinct provider or platform. In such embodiments, instead of an LLM system comprising domain specific language engines 300-304, each of domain specific language engines 300-304 may be a distinct LLM system (e.g., provided by a different service provider or company). For example, domain X specific language engine 300 may be trained, owned, or operated by OpenAI, domain Y specific language engine 302 may be trained, owned, or operated by Google, and domain Z specific language engine 304 may be trained, owned, or operated by Amazon. In some embodiments, a domain specific language engine may be trained, owned or operated by a network test system vendor.

Referring to FIG. 3, in some embodiments, LCB 107 may be configured for selecting or specifying one or more domain specific language engines 300-304 for obtaining output. For example, if user input indicates a test case involving a wireless 5G networking environment, LCB 107 may send a request (e.g., a prompt based at least in part on input from user 104) to domain X specific language engine 300 (e.g., a 5G domain-specific LLM) via an API '1' associated with domain X specific language engine 300 and if user input indicates a test case involving a wireless 4G networking environment, LCB 107 may send a request (e.g., a prompt based at least in part on input from user 104) to domain Y specific language engine 302 (e.g., a 4G domain-specific LLM) via an API '2' associated with domain Y specific language engine 302.

In some embodiments, LCB 107 may communicate with domain specific language engines 300-304 using a single or common API (e.g., LLM API 116), e.g., domain specific language engines 300-304 may be hosted by a same provider and/or platform (e.g., LLM system 118). For example, LCB 107 may send a request (e.g., a prompt based at least in part on input from user 104) to domain X specific language engine 300 by issuing one or more command(s) or instruction(s) (e.g., a REST GET message) via LLM API 116, where LLM API 116 is configured to interact with domain specific language engines 300-304 and where the command(s) or instruction(s) (e.g., a REST GET message) include parameter values (e.g., an LLM ID) indicating that domain X specific language engine 300 is to be used.

In some embodiments, LCB 107 may provide instruction augmentation functionality (e.g., similar to such functionality described above) during multi-transaction exchanges or interactions with an LLM (e.g., one of domain specific language engines 300-304) via one or more APIs, e.g., LLM API 116. For example, user 104 may speak or type input (e.g., natural language instructions, high-level intent based test directives, etc.) to NTS 102 or related entities (e.g., UI 194, LCB 107, etc.), which in turn passes the input to LLM system 118 (or one of domain specific language engines 300-304) via LLM API 116 with little or no modification. In this example, e.g., after LLM system 118 (or one of domain specific language engines 300-304) initially responds, LCB 107 may be configured for providing additional input (e.g., predefined SUT information, topology data, test system resource data, GUI-provisioned DUT/SUT information, etc.) in requests or commands to LLM system 118 (or one of domain specific language engines 300-304) via LLM API 116, thereby augmenting the original input from user 104.

In some embodiments, LCB 107 may provide instruction augmentation or modification functionality after output is received from LLM system 118 (or one of domain specific language engines 300-304) via LLM API 116. For example, LCB 107 or another entity may use stored logic or rules for verifying, correcting, translating, or otherwise augmenting output from LLM system 118 prior to using the output in test configuration or test execution. In this example, assume LLM output provides pseudo code that is missing resource IDs and IP addresses, LCB 107 or another entity may identify the code portions that are missing needed information and replace or modify those code portions by including the needed information.

It will be appreciated that FIG. 3 is for illustrative purposes and that various functionality described above in relation to FIG. 3 may be changed, altered, added, or removed.

Figure 4A:
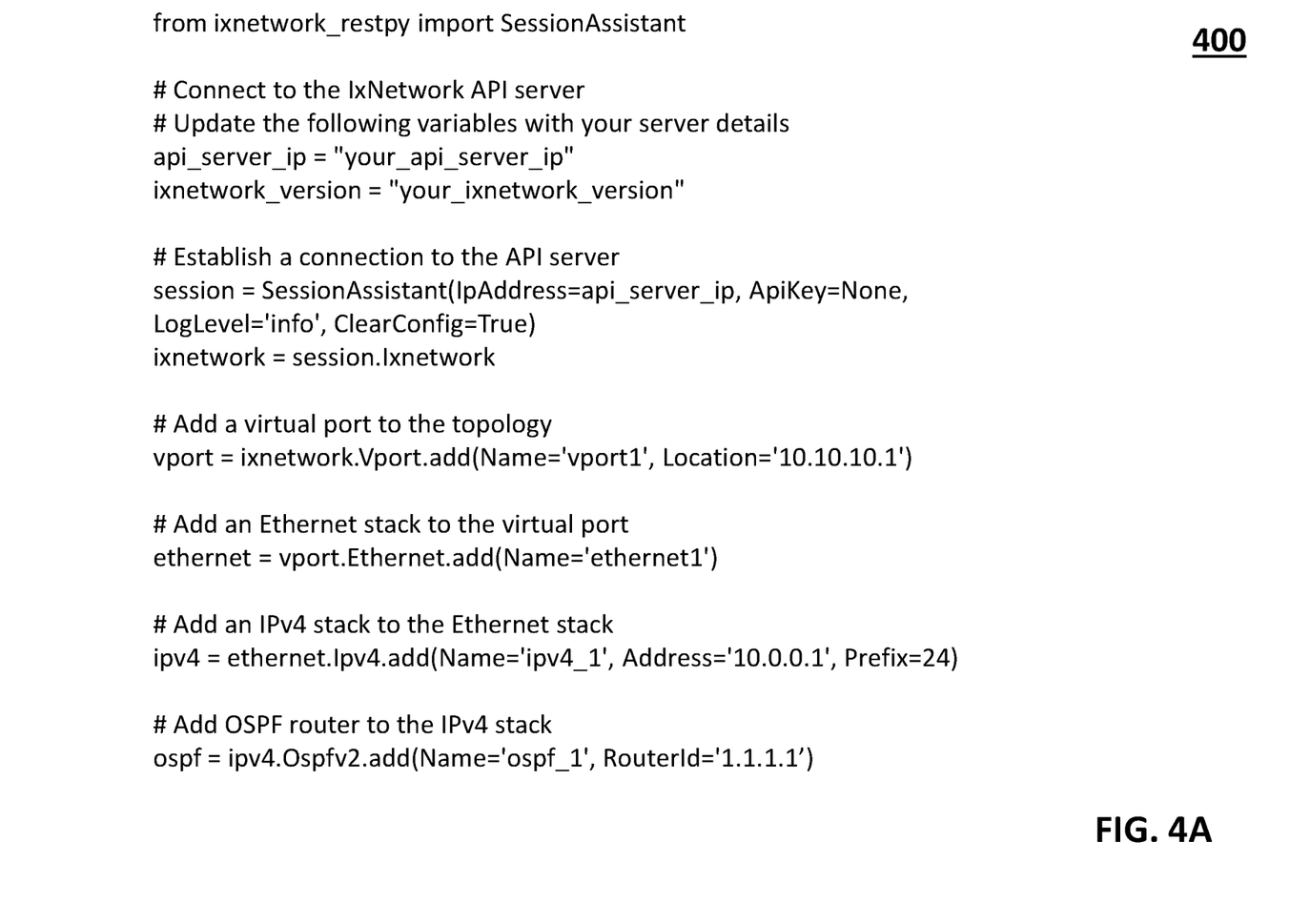
FIGS. 4A-4C are diagrams illustrating example LLM output associated with test configuration.
Figure 4B:
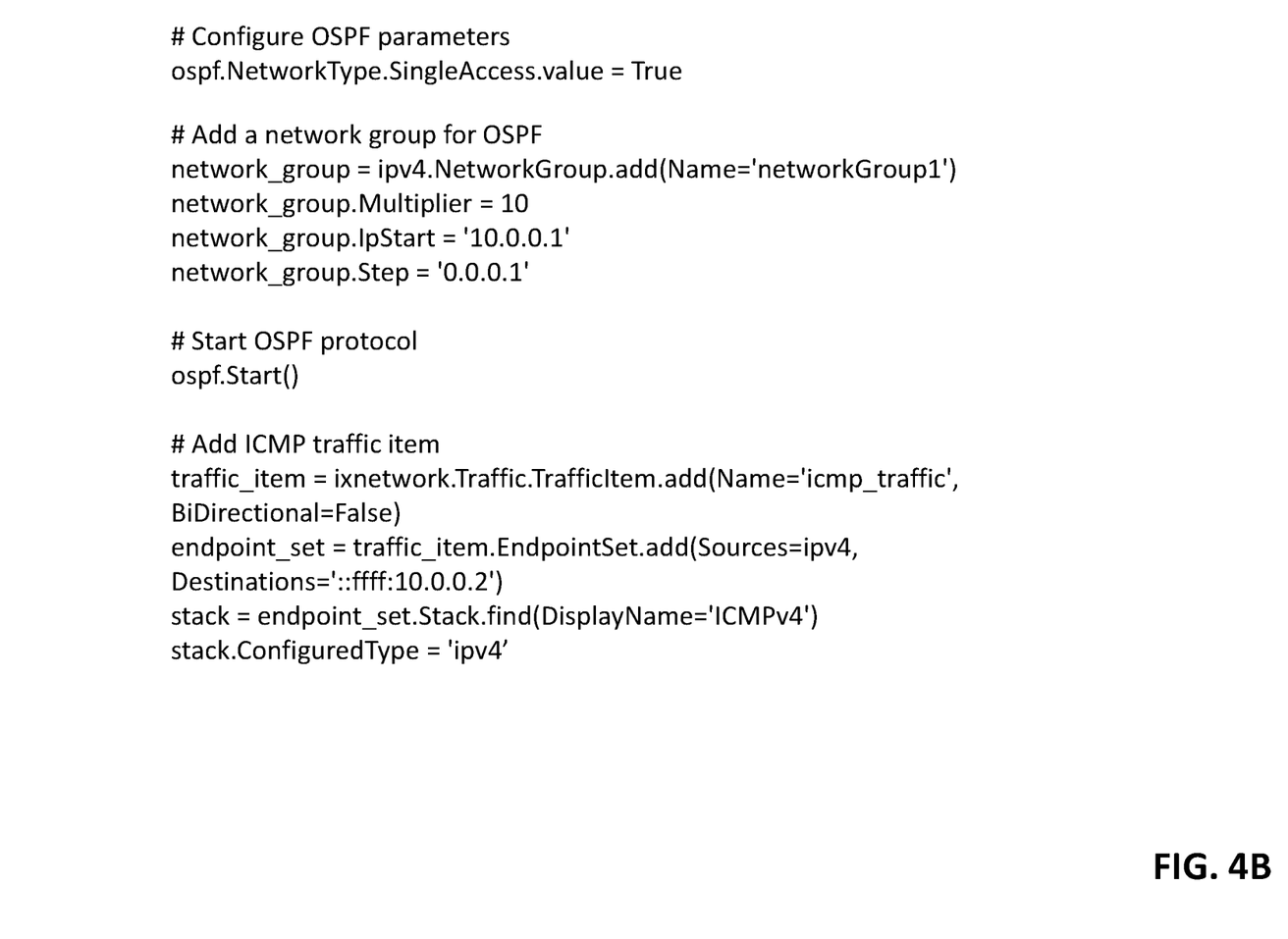
Figure 4C:
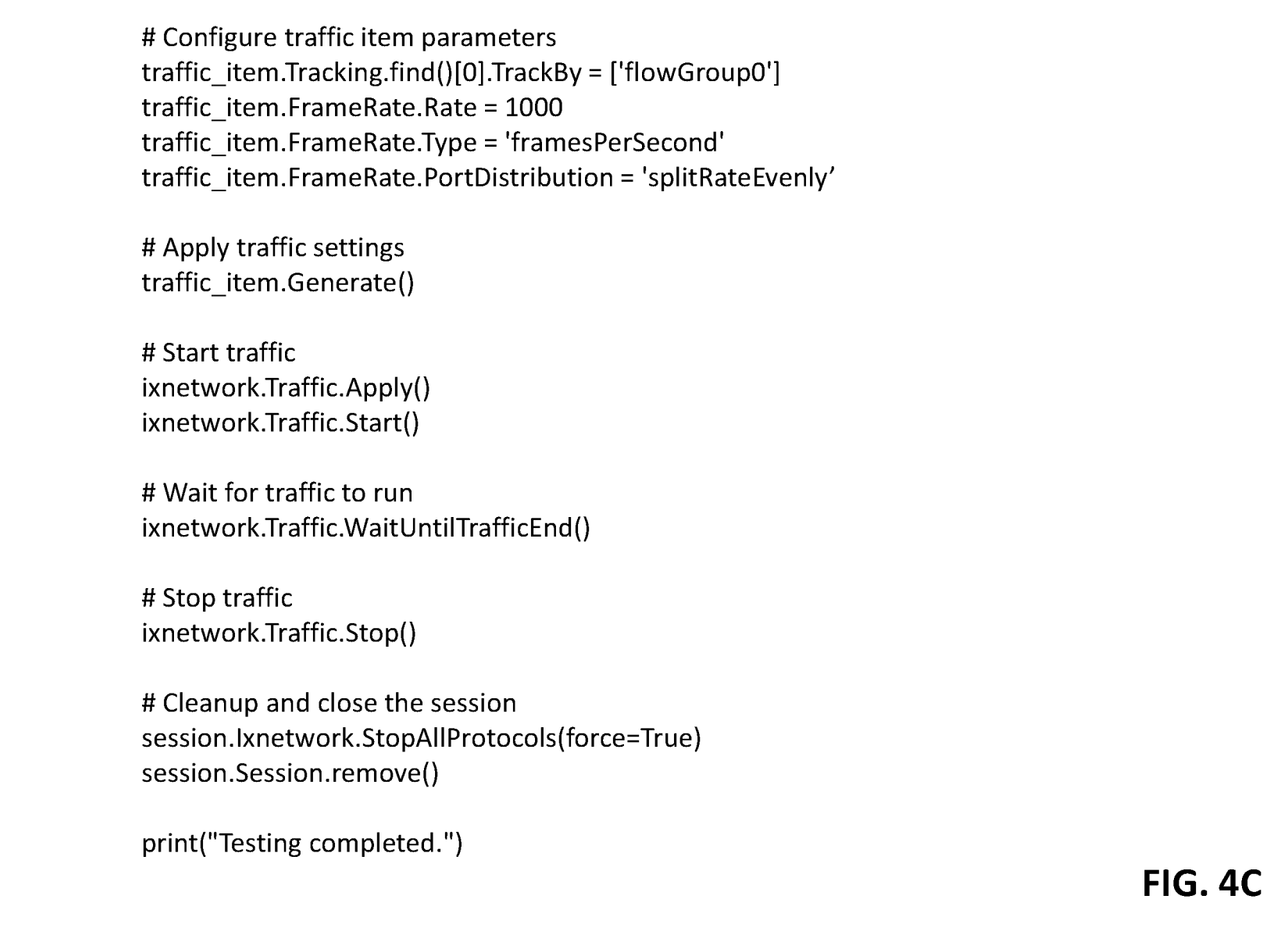

FIGS. 4A-4C are diagrams illustrating example LLM output 400 associated with test configuration. Referring to FIGS. 4A-4C, LLM output 400 may include a Python script provided by Open AI ChatGPT 3.5 in response to a user prompt stating "Create configuration instructions in Python for testing OSPF and ICMP in a data center under test using IxNetwork." For example, user 104 may provide user input (e.g., the above user prompt) via UI 194 or LCB 107 and LCB 107 may send the user input to LLM system 118 via LLM API 116. In this example, LLM output 400 may be generated and provided to LCB 107 via LLM API 116. Continuing with this example, LCB 107 or another entity may use the Python code of LLM output 400 to configure NTS 102 or entities thereof (e.g., an IxNetwork™ platform).

In some embodiments, LLM output 400 may include code and metadata. In some embodiments, metadata may include code comments and advice or feedback regarding how to use code or additional areas where code can be modified to provide a better or more complete instructions for test configuration. In this example, the metadata of LLM output 400 may indicate that the internet protocol (IP) addresses, network settings, and traffic parameters should be customized according to the test environment and/or that error handling, advanced configurations, and result analysis should be added to the Python code for a more realistic or complete test configuration script.

In some embodiments, LCB 107 or another entity may use LLM output 400 (e.g., code and/or metadata in an initial response) to further interact with LLM system 118 and may provide additional data (e.g., an appropriate IP range to use, available test system resources to use, high level error handling logic, additional user input, etc.) to LLM system 118 for more complete or more detailed test configuration instructions.

In some embodiments, LCB 107 or another entity may use LLM output 400 obtained from one LLM as input to another LLM for obtaining more complete or more detailed test configuration instructions. For example, LCB 107 or another entity may use LLM output 400 (e.g., code and/or metadata in an initial response) from domain X specific language engine 300 to interact with domain Y specific language engine 302 and may provide additional data (e.g., an appropriate IP range to use, available test system resources to use, high level error handling logic, additional user input, etc.) to domain Y specific language engine 302 for more complete or more detailed test configuration instructions.

In some embodiments, prior to usage of LLM output 400, LCB 107 or another entity may perform various actions to verify, correct, translate, and/or supplement LLM output 402. For example, using predetermined logic, metadata or feedback from LLM system 118, and/or a Python code generator, LCB 107 or another entity may modify or adjust Python configuration instructions prior to using these LLM generated instructions for actual test configuration or test execution.

It will be appreciated that FIGS. 4A-C are for illustrative purposes and that various functionality described above in relation to FIGS. 4A-C may be changed, altered, added, or removed.

Figure 5:
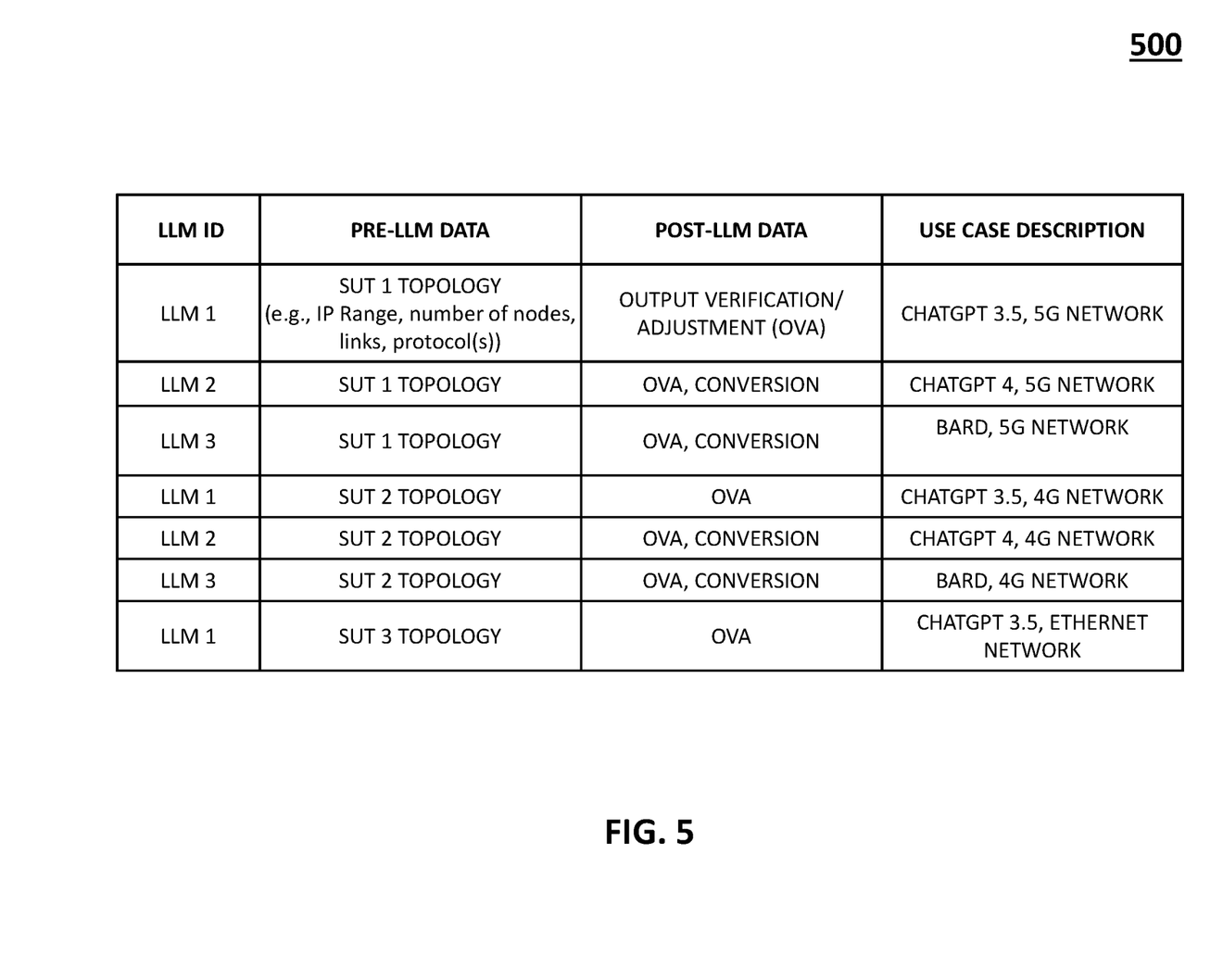
FIG. 5 is a diagram illustrating example test configuration metadata usable for generating network test configuration information.

FIG. 5 is a diagram illustrating example test configuration metadata 500 usable for generating network test configuration information. In some embodiments, metadata 500 may include any suitable information for facilitating test configuration or related information usable for test configuration. For example, metadata 500 may include an LLM or model ID, pre-LLM data (e.g., data or logic to add or use in LLM prompt generation), post-LLM data (e.g., data or logic to use in processing LLM generated output) and a use case description or other data associated with an LLM, e.g., a human readable description indicating a particular use case or test scenario associated with corresponding metadata.

In some embodiments, LCB 107 or another entity may utilize metadata 500 to select appropriate LLMs, to generate appropriate user prompts, and/or to improve or verify LLM generated output. For example, prior to communicating user input or a related user prompt to LLM system 118, LCB 107 may analyze user input from user 104 to identify an appropriate LLM and an appropriate SUT topology (e.g., a network of available test system resources and links for achieving user-intended test objectives). In this example, LCB 107 may use this information to identify corresponding pre-LLM data (e.g., rules, logic, or data) to supplement the user input and use this data to create a user prompt for triggering output from LLM system 118. Continuing with this example, after receiving LLM output and prior to NTS 102 utilizing the LLM output, LCB 107 may identify corresponding post-LLM data (e.g., rules, logic, or data) to supplement or augment the LLM output and use this data to create actual test configuration rules or instructions for NTS 102 or related test system resources.

In some embodiments, metadata 500 or other data may be accessed and/or stored by NTS 102 and/or other entities (e.g., LCB 107, TRM 108, TC 106, etc.) using one or more data structures or storage devices. For example, data storage 109 or another entity may include a local data store comprising metadata 500 or a portion thereof.

Referring to FIG. 5, metadata 500 may be depicted using a table representing various types of data associated with brokering communications involving LLM system 118 or an LLM thereof. For example, each table row depicted in FIG. 5 may represent an LLM ID indicating a particular LLM (e.g., LLM system 118, one of language engines 300-304, etc.) for a use case, pre-LLM data (e.g., SUT and/or environment information for prompt generation) for the use case, post-LLM data (e.g., verification and/or augmentation logic for generating actual or "final" test configuration rules or instructions) for the use case, and a use case description or other information for describing the use case or test scenario associated with corresponding metadata.

An LLM ID may include any suitable information for identifying a trained LLM or language engine for generating output associated with test configuration and/or test execution. For example, an LLM ID may be a value (e.g., an alphanumeric value, an integer, or a letter) that uniquely identifies a trained LLM or language engine, e.g., an LLM version from a particular AI service provider. In this example, the LLM ID may act as a lookup value or as part of a lookup value (e.g., along with SUT environment) for determining corresponding pre-LLM and post-LLM data.

Pre-LLM data may include any suitable information for generating or improving user input to an LLM for a particular use case or test scenario. For example, pre-LLM data may include logic or data that can generate a user prompt based on user intent and/or other information, e.g., SUT topology or environment information, an IP address range, traffic protocols, traffic patterns, link speeds, number of nodes, etc. In this example, LCB 107 or another entity may determine a use case (e.g., by analyzing user input to identify an appropriate LLM and an SUT environment) and, based on the use case, LCB 107 or another entity may identify and use appropriate pre-LLM data to generate a user prompt for triggering the LLM to generate LLM output.

Post-LLM data may include any suitable information for generating or improving LLM output for a particular use case or test scenario. For example, post-LLM data may include data (e.g., actual resource IDs, IP addresses, etc.) or logic (e.g., an output verification and/or adjustment logic, a conversion algorithm, etc.) for generating actual or "final" test configuration rules or instructions. In this example, LCB 107 or another entity may determine a use case (e.g., by analyzing user input to identify an appropriate LLM and an SUT environment) and, based on the use case, LCB 107 or another entity may identify and use appropriate post-LLM data to generate test configuration rules or instructions that can be sent or provided to test system resources (e.g., TG 114, test agents, monitoring agents, etc.), e.g., by TRM 108.

A use case description or other data associated with a particular use case or test scenario may include a text description of input, output, or other information. For example, a use case description may indicate a use case by identifying a particular SUT environment (e.g., 5G, 4G, hybrid, Ethernet switching fabric, etc.) and a particular LLM or version thereof (e.g., ChatGPT, Bard, Llama, Gemini, Copilot, CodeWhisperer, etc.).

It will be appreciated that metadata 500 in FIG. 5 is for illustrative purposes and that different and/or additional information may also be stored or maintained. Further, it will be appreciated that metadata 500 or related data may be stored in various data structures, memories, or computer readable media and that metadata 500 or related data may be stored in one or more locations.

Figure 6:
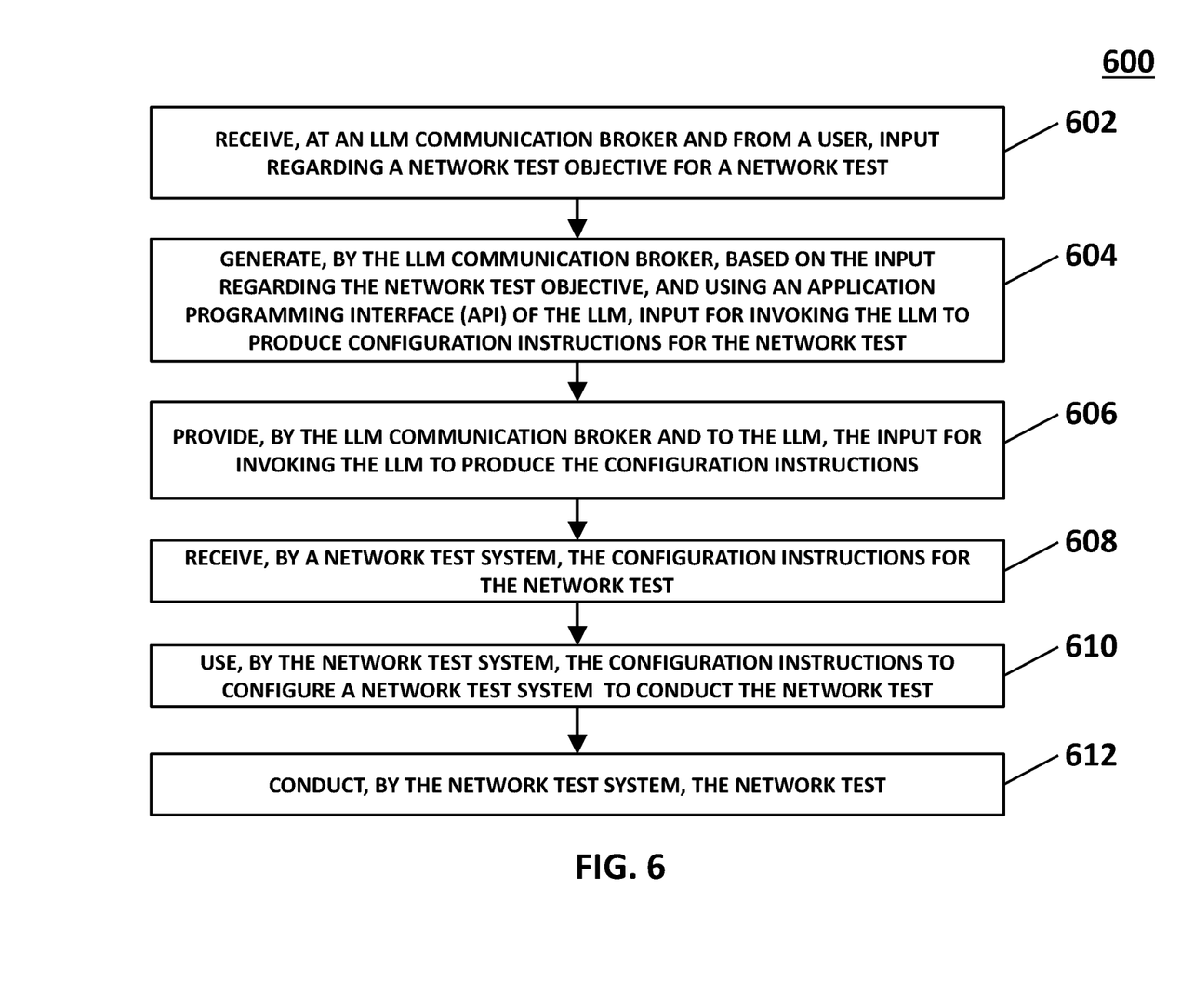
FIG. 6 is a block diagram illustrating an example process for network test configuration and execution using brokered communications with an LLM.

FIG. 6 is a block diagram illustrating an example process 600 for network test configuration and/or execution using brokered communications with an LLM. In some embodiments, example process 600 may include steps 602, 604, 606, 608, 610, and/or 612. In some embodiments, process 600, or portions thereof, may be performed by network test system 102, TC 106, LCB 107, and/or another node or module.

Referring to FIG. 6, in step 602, input regarding a network test objective for a network test may be received at LCB 107 and from user 104. In some embodiments, receiving input may include receiving natural language input from the user regarding a network test objective, e.g., a configuration objective or an SUT performance objective.

In step 604, input for invoking an LLM (e.g., LLM system 118) to produce configuration instructions for the network test may be generated by LCB 107, based on the input regarding the network test objective, and using an API of the LLM. In some embodiments, generating input for invoking an LLM may include engineering a prompt to the LLM for invoking the LLM to produce configuration instructions. In some embodiments, generating input for invoking an LLM may include supplementing the input from user 104 with input regarding NTS 102, test system resource(s), and/or SUT topology.

In step 606, the input for invoking the LLM to produce the configuration instructions may be provided by LCB 107 to the LLM. In some embodiments, providing input to an LLM may include providing input to an artificial intelligence chatbot. In some embodiments, an artificial intelligence chatbot may include a ChatGPT chatbot.

In some embodiments, providing input to an LLM may include selecting a domain specific LLM based on input from user 104.

In step 608, the configuration instructions for the network test may be received by network test system 102.

In step 610, the configuration instructions to configure a network test system to conduct the network test may be used by network test system 102. In some embodiments, using configuration instructions to configure a network test may include configuring one or more network traffic generators (e.g., TG 114) to generate and send network traffic to a SUT (e.g., SUT 115 or DUT thereof).

In step 612, the network test may be conducted by network test system 102.

In some embodiments, process 600 may comprise iteratively communicating, by LCB 107 and with the LLM, to refine the configuration instructions. For example, if LLM system 118 requests or indicates that some information is needed, LCB 107 may obtain the information (e.g., via user 104 or data storage 109) and provide it to LLM system 118. In this example, LCB 107 may be configured to iteratively provide additional information until no additional information is needed by LLM system 118, useful LLM output is provided by LLM system 118, or a stop value or criterium is reached (e.g., a time limit is met or 10 follow-on requests is sent).

In some embodiments, process 600 may comprise receiving, by LCB 107, the configuration instructions, determining that the configuration instructions may be inconsistent with available resources of network test system 102, and updating the configuration instructions based on the available resources of network test system 102.

In some embodiments, receiving test configuration instructions may include receiving updated test configuration instructions from LCB 107.

It will be appreciated that process 600 is for illustrative purposes and that different and/or additional actions may be used. It will also be appreciated that various actions described herein may occur in a different order or sequence.

It should be noted that network test system 102, TC 106, LCB 107, and/or various modules, nodes, or functionality described herein may constitute a special purpose computing platform, device, or system. For example, network test system 102, TC 106, or LCB 107 may be a network appliance or node configured to perform various aspects described herein. Further, network test system 102, TC 106, LCB 107, or functionality described herein can improve the technological field of network testing by providing various techniques, systems, methods, or mechanisms for network test configuration and/or execution using brokered communications with an LLM.

It will be understood that various details of the subject matter described herein may be changed without departing from the scope of the subject matter described herein. Furthermore, the foregoing description is for the purpose of illustration only, and not for the purpose of limitation, as the subject matter described herein is defined by the claims as set forth hereinafter.

What is claimed is:

1. A method for network test configuration and execution using brokered communications with a large language model (LLM), the method comprising:
   receiving, at a large language model (LLM) communication broker and from a user, input regarding a network test objective for a network test;
   generating, by the LLM communication broker, based on the input regarding the network test objective, and using an application programming interface (API) of the LLM, input for invoking the LLM to produce configuration instructions for the network test;
   providing, by the LLM communication broker and to the LLM, the input for invoking the LLM to produce the configuration instructions, wherein providing the input for invoking the LLM includes supplementing, by the LLM communication broker, the input from the user regarding the test objective for the network test with at least one of input regarding network test system resources and input regarding system under test (SUT) topology;
   receiving, by a network test system, the configuration instructions for the network test;
   using, by the network test system, the configuration instructions to configure a network test system to conduct the network test; and
   conducting, by the network test system, the network test.

2. The method of claim 1 receiving the input includes receiving natural language input from the user regarding the network test objective.

3. The method of claim 1 wherein generating the input for invoking the LLM includes engineering a prompt to the LLM for invoking the LLM to produce the configuration instructions.

4. The method of claim 1 wherein using the configuration instructions to configure the network test includes configuring one or more network traffic generators to generate and send network traffic to a device under test.

5. The method of claim 1 wherein providing the input to the LLM includes selecting a domain specific LLM based on the input from the user.

6. The method of claim 1 wherein providing the input to the LLM includes providing the input to an artificial intelligence chatbot, wherein the artificial intelligence chatbot comprises a chat generative pretrained transformer chatbot.

7. The method of claim 1 comprising, iteratively communicating, by the LLM communication broker and with the LLM, to refine the configuration instructions.

8. The method of claim 1 comprising receiving, by the LLM communication broker, the configuration instructions, determining that the configuration instructions are inconsistent with available resources of the network test system, and updating the configuration instructions based on the available resources of the network test system and wherein receiving the test configuration instructions includes receiving the updated test configuration instructions from the LLM communication broker.

9. A system for network test configuration and execution using brokered communications with a large language model (LLM), the system comprising:
   a memory;
   at least one processor; and
   a network test system implemented using the memory and the at least one processor, the network test system configured for:
      receiving, at a large language model (LLM) communication broker and from a user, input regarding a network test objective for a network test;
      generating, by the LLM communication broker, based on the input regarding the network test objective, and using an application programming interface (API) of the LLM, input for invoking the LLM to produce configuration instructions for the network test;
      providing, by the LLM communication broker and to the LLM, the input for invoking the LLM to produce the configuration instructions, wherein providing the input for invoking the LLM includes supplementing, by the LLM communication broker, the input from the user regarding the test objective for the network test with at least one of input regarding network test system resources and input regarding system under test (SUT) topology;
      receiving, by a network test system, the configuration instructions for the network test;
      using, by the network test system, the configuration instructions to configure a network test system to conduct the network test; and
      conducting, by the network test system, the network test.

10. The system of claim 9 wherein receiving the input includes receiving natural language input from the user regarding the network test objective.

11. The system of claim 9 wherein generating the input for invoking the LLM includes engineering a prompt to the LLM for invoking the LLM to produce the configuration instructions.

12. The system of claim 9 wherein using the configuration instructions to configure the network test includes configuring one or more network traffic generators to generate and send network traffic to a device under test.

13. The system of claim 9 wherein providing the input to the LLM includes selecting a domain specific LLM based on the input from the user.

14. The system of claim 9 wherein providing the input to the LLM includes providing the input to an artificial intelligence chatbot.

15. The system of claim 14 wherein the artificial intelligence chatbot comprises a chat generative pretrained transformer chatbot.

16. The system of claim 9 wherein the network test system is further configured for iteratively communicating, by the LLM communication broker and with the LLM, to refine the configuration instructions.

17. The system of claim 9 wherein the network test system is further configured for receiving, by the LLM communication broker, the configuration instructions, determining that the configuration instructions are inconsistent with available resources of the network test system, and updating the configuration instructions based on the available resources of the network test system and wherein receiving the test configuration instructions includes receiving the updated test configuration instructions from the LLM communication broker.

18. A non-transitory computer readable medium having stored thereon executable instructions that when executed by a processor of a computer control the computer to perform steps comprising:
   receiving, at a large language model (LLM) communication broker and from a user, input regarding a network test objective for a network test;
   generating, by the LLM communication broker, based on the input regarding the network test objective, and using an application programming interface (API) of the LLM, input for invoking the LLM to produce configuration instructions for the network test;
   providing, by the LLM communication broker and to the LLM, the input for invoking the LLM to produce the configuration instructions, wherein providing the input for invoking the LLM includes supplementing, by the LLM communication broker, the input from the user regarding the test objective for the network test with at least one of input regarding network test system resources and input regarding system under test (SUT) topology;
   receiving, by a network test system, the configuration instructions for the network test;
   using, by the network test system, the configuration instructions to configure a network test system to conduct the network test; and
   conducting, by the network test system, the network test.

* * * * *